(12) United States Patent
Amanai (10) Patent No.: US 7,095,570 B2
(45) Date of Patent: Aug. 22, 2006

(54) IMAGING OPTICAL SYSTEM AND ELECTRONIC APPARATUS USING THE SAME

(75) Inventor: Takahiro Amanai, Sagamihara (JP)

(73) Assignee: Olympus Corporation, Tokyo (JP)

( * ) Notice: Subject to any disclaimer, the term of this patent is extended or adjusted under 35 U.S.C. 154(b) by 97 days.

(21) Appl. No.: 10/842,650

(22) Filed: May 11, 2004

(65) Prior Publication Data

US 2005/0013017 A1    Jan. 20, 2005

(30) Foreign Application Priority Data

May 12, 2003  (JP)  ............................. 2003-133445
May 6, 2004   (JP)  ............................. 2004-137639

(51) Int. Cl.
*G02B 9/34*    (2006.01)

(52) U.S. Cl. ...................... 359/781; 359/770; 359/686; 359/680

(58) Field of Classification Search ................ 359/781, 359/770, 686, 680, 715, 716, 753

See application file for complete search history.

(56) References Cited

U.S. PATENT DOCUMENTS 6,414,802 B1 *  7/2002  Betensky ...................... 359/753

2005/0024747 A2 *  2/2005  Chen ........................... 359/753

FOREIGN PATENT DOCUMENTS

| JP | 11-030745 | 2/1999 |
| JP | 11-084234 | 3/1999 |
| JP | 200-171697 | 6/2000 |

* cited by examiner

*Primary Examiner*—Timothy Thompson
(74) *Attorney, Agent, or Firm*—Pillsbury Winthrop Shaw Pittman LLP

(57) ABSTRACT

An optical system includes in order from an object side, a negative lens having a concave surface directed toward an object side, an aperture stop, a double convex lens, a negative meniscus lens having a convex surface directed toward an image side, and a positive lens. A surface at the object side of the fourth positive lens is constituted with an aspherical surface, a radius of curvature which decreases from a center portion toward a circumferential portion and a surface at the image side of the positive lens an aspherical surface, radius of curvature of which increases from the center portion toward the circumferential portion and the following condition is satisfied:

$$0.05 < \phi m / \phi p < 0.80$$

where m represents the power of the positive lens at the position of the maximum light height and p represents the power of the positive lens at the position the praxis.

6 Claims, 10 Drawing Sheets

Fig.6C DISTORTION IH = 3.0mm

Fig.6B ASTIGMATISM IH = 3.0mm

Fig.6A SPHERICAL ABERRATION ω = 33°

IMAGING OPTICAL SYSTEM AND ELECTRONIC APPARATUS USING THE SAME

BACKGROUND OF THE INVENTION

1. Field of the Invention

The present invention relates to an image forming optical system which can be used for an imaging unit with the solid-state imaging element of CCD, CMOS and the like. For example, it relates to an image forming optical system which can be used for a miniature camera and a monitor camera and the like which are equipped in, for example, a digital still camera, a digital video camera, a cellular phone, PC and the like. Furthermore, the present invention also relates to an electronic instrument such as a digital still camera, a digital video camera, a cellular phone, PC and the like which use the image forming optical system.

2. Description of the Related Art

In recent years, electronic cameras for taking a photograph by using a solid-state imaging element like CCD and CMOS instead of using a silver salt film have become popular. In such electronic cameras, for an imaging unit which is equipped in a portable type computer or a cellular phone and the like, miniaturization and weight-lightening have been particularly demanded.

SUMMARY OF THE INVENTION

The image forming optical system of the present invention comprises in order from an object side, a first lens which is a negative lens having a concave surface directed toward an object side, an aperture stop, a second lens which is a double convex lens, a third lens which is a negative meniscus lens having a convex surface directed toward an image side and a fourth lens which is a positive lens.

In the image forming optical system of the present invention, a surface at an object side of the fourth lens is formed an aspherical surface, radius of curvature of which decreases from a center portion toward a circumferential portion and a surface at an image side of the fourth lens is formed an aspherical surface, radius of curvature of which increases from a center portion toward a circumferential portion and the following condition is satisfied:

$$0.05 < \phi m/\phi p < 0.80$$

where $\phi m$ represents a power of the fourth lens at the position of the maximum light height and $\phi p$ represents a power of the fourth lens at the position of the praxis.

The image forming optical system according to the present invention satisfies the following condition:

$$-10.0 < r1f/f < -1.0$$

where r1f represents a radius of curvature of a surface at an object side of the first lens and f represents a whole focal length of the optical system.

The image forming optical system according to the present invention satisfies the following condition:

$$0.03 < ML/TL < 0.15$$

where TL represents a whole length of the image forming optical system and ML represents the minimum thickness on the axis of a plastic lens constituting the image forming optical system.

The electric device according to the present invention is equipped with the image forming optical system mentioned above.

According to the present invention, a highly efficient image forming optical system can be offered, wherein performance degradation due to a manufacture error when it is miniaturized is little.

These and other features and advantages of the present invention will become apparent from the following detailed description of the preferred embodiments when taken in conjunction with the accompanying drawings.

DETAILED DESCRIPTION OF THE PREFERRED EMBODIMENTS

Prior to explaining embodiments, reasons why the constitution of the present invention has been made as well as function and advantages of the present invention will be explained.

The image forming optical system of the present invention is constituted with four lenses which are a first lens, a second lens, a third lens and a fourth lens, taking into consideration of performance and miniaturization.

If an image forming optical system is constituted with five or more lenses, it is evident that the performance is improved further. However, if the number of lenses increases by one, the thickness of a lens, the distance between lenses and the space of frames increase accordingly, and enlarging of the size is inevitable.

In case that an image forming optical system is constituted with three lenses or less than three lenses, coexistence of reduction of chromatic aberration at the axis and reduction of a curvature of field is difficult.

Even if many aspherical surfaces are used in order to secure performance, manufacture is difficult since decentering sensitivity becomes large. Therefore, as for performance and size, it is the most appropriate that an image forming optical system is constituted with four lenses like the present invention.

In the present invention, the first lens is constituted with a negative meniscus lens having a concave surface directed toward an object side. By such constitution a wide angle optical system can be achieved since a surface at utmost object side becomes negative power.

When, for example, CCD as an imaging element is used in order to maintain a good performance for condensing light, the incident angle of light to an imaging element must be made small. For this purpose, it is desirable to arrange an aperture stop at a distant position from an image plane, or to arrange an image of the aperture stop at a distant position from an image plane.

In a wide angle optical system, it is necessary to reduce generation of distortion in a circumferential portion and chromatic aberration of magnification of a picture image plane. For this purpose, it is desirable to arrange an aperture stop at the position where power arrangement of an optical system becomes symmetrical.

From such two reasons mentioned above, in the image forming optical system of the present invention the aperture stop is arranged between the first lens and the second lens. That is, the image forming optical system of the present invention is constituted as an optical system in which wide angle and telecentric function are much noted as important factors.

In the image forming optical system of the present invention, a third lens is constituted with a negative meniscus lens having a convex surface directed toward an image side.

By such arrangement, deflection angle, that is, an angle which is formed by an incident light and an emanated light, can be kept small, and generation of an aberration at each refracting surface can be suppressed. A fluctuation of the performance of lens at the relative decentering state can be small to the utmost since an amount of aberration generated at non decentering state is small.

The fourth lens is an important lens for making an incident angle of the light to an imaging element small.

However, if the fourth lens is constituted, as shown in the present invention, that a surface at an object side of the fourth lens is formed to be an aspherical surface where a radius of curvature decreases toward a circumferential portion and a surface at the image side of the fourth lens is formed to be an aspherical surface where a radius of curvature increases toward a circumferential portion respectively, an incident angle of the light at a circumferential portion to the imaging element can be made small. By such arrangement, a deflection angle, that is, an angle which is formed by an incident light to the fourth lens and an emanated light from the fourth lens, can be kept small and generation of an aberration can be suppressed, and restrictive condition for achieving miniaturization can be satisfied.

For this purpose, it is important to satisfy the following conditions (1).

$$0.05 < \phi m/\phi P < 0.80 \tag{1}$$

where $\phi m$ represents a power of the fourth lens at the position of the maximum light height and $\phi p$ represents a power of the fourth lens at the position of paraxis.

=Here, the power $\phi m$ of the lens at the position with the maximum light height is defined as follows. It is given by $\phi m = \tan \xi / Hm$, when a parallel light is entered to the maximum light height Hm of the lens to be an object from the infinite point of the object side, and an inclined angle after passing through the lens is $\xi$.

When $\phi m/\phi p$ exceeds the upper limit of this condition (1), the power of the circumferential portion of the lens becomes too much strong and correction of the incident angle of the light becomes excessive. On the other hand, when it is less than the lower limit, the power of the circumferential portion of the lens becomes too much weak and the correction of the incident angle of the light becomes insufficient.

In the image forming optical system of the present invention, it is better to satisfy the following condition (1').

$$0.15 < \phi m/\phi p < 0.60 \tag{1'}$$

Further, it is better to satisfy the following condition (1").

$$0.25 < \phi m/\phi p < 0.40 \tag{1''}$$

In order to obtain a large angle of field, it is necessary to make an incident surface utmost at the object side negative power moderately. Therefore, the radius of curvature of the first lens becomes important. Therefore, in the image forming optical system of the present invention, it is good to satisfy the following condition (2).

$$-10.0 < r1f/f < -1.0 \tag{2}$$

where r1f represents a radius of curvature of the first lens at an object side and f is a focal length of the image forming optical system as a whole system.

When r1f/f exceeds the upper limit of this condition (1), the power of the first surface becomes too much strong and the correction of the spherical aberration generated on the first surface becomes difficult.

Moreover, miniaturization cannot be achieved since the principal point position of the first lens shifts to the image side and the whole length of the image forming optical system becomes long.

On the other hand, when it is less than the lower limit of the condition (2), the power of the first surface becomes small too much, and it becomes impossible to attain a wide angle optical system. It is desirable to satisfy the following condition (2').

$$-5.0 < r1f/f < -1.2 \tag{2'}$$

It is more desirable to satisfy the following condition (2").

$$-2.0 < r1f/f < -1.4 \tag{2''}$$

In the image forming optical system of the present invention, by arranging that the composite power of the first lens and the second lens is made strong positive power arrangement, and the composite power of the third lens and the fourth lens is made weak positive power arrangement or negative power arrangement, the whole length of the image forming optical system can be made small.

In order to keep balance well of the whole length of the optical system and the performance to this type of power arrangement, it is desirable to satisfy the following condition (3):

$$0.3 < f12/f < 2.0 \quad (3)$$

where f12 represents a focal length of the first lens and f represents the whole focal length of the whole image forming optical system.

When f12/f exceeds the upper limit of this condition (3), the composite power of the first lens and the second lens becomes too much small. Therefore, it is disadvantageous to shorten the whole length of the image forming optical system. On the other hand, when it less than the lower limit of the condition (3), the composite power of the first lens and the second lens becomes too strong. Accordingly, the composite power of the third lens and the fourth lens must be strong to negative side.

As a result, an amount of aberration generated in each lens increases, and it becomes to difficult to secure performance.

Preferably, it is good to satisfy the following condition (3').

$$0.4 < f12/f < 1.5 \quad (3')$$

More preferably, in the image forming optical system of the present invention, it is good to satisfy the following condition (3").

$$0.6 < f12/f < 1.0 \quad (3'')$$

When CCD is used for an imaging element, the phenomenon so-called shading occurs.

This is the phenomenon in which the brightness of the picture image differs at the center portion of the picture image and at the circumferential portion of the picture image when an off-axis light flux emanated from an optical system enters into an image plane.

On the other hand, if an incident angle to the image plane is small, the shading problem is mitigated. However, in this case, the whole length of imaging optical system becomes long.

Therefore, in order to suppress generation of the shading and to shorten the whole length of the image forming optical system, it is desirable to satisfy the following condition (4).

$$0.5 < EXP/f < 2.5 \quad (4)$$

where EXP represents a distance of the exit pupil from an image plane and f is the whole focal length of the image forming optical system.

When EXP/f exceeds the upper limit of condition (4), the whole length becomes long. On the other hand, if it is less than the lower limit of condition (4), the incident angle to CCD becomes large too much, and accordingly the brightness of the circumferential portion of the picture image decreases.

It is desirable to satisfy the following condition (4'):

$$0.8 < EXP/f < 2.0 \quad (4')$$

Furthermore, it is desirable to satisfy the following condition (4").

$$1.2 < EXP/f < 1.8 \quad (4'')$$

It is desirable to satisfy the following condition (5):

$$0.55[1/\mu m] < Fno/P[\mu m] < 2.10[1/\mu m] \quad (5)$$

where Fno represents F number fully opened of the image forming optical system and P represents the pixel pitch of an imaging element.

When Fno/P exceeds the upper limit of the condition (5), the optical system becomes too dark, or a light quantity per one picture element becomes small since the pixel pitch of the picture element becomes too small.

Therefore, shutter speed becomes slow, and this brings a cause of hand blur and increase of noise owing to long exposure time. On the other hand, when it is less than the lower limit of the condition, the pixel pitch of the picture element becomes too large and an imaging data with fine pixel pitch cannot be obtained.

In the image forming optical system of the present invention, it is better to satisfy the following condition:

$$0.65[1/\mu m] < Fno/P[\mu m] < 1.50[1/\mu m] \quad (5')$$

In the image forming optical system of the present invention, it is more better to satisfy the following condition.

$$0.77[1/\mu m] < Fno/P[\mu m] < 1.18[1/\mu m] \quad (5'')$$

When it is defined that TL represents the whole length of the image forming optical system and ML represents the minimum thickness on the axis of a plastic lens constituting the image forming optical system, it is more better to satisfy the following condition:

$$0.03 < ML/TL < 0.15 \quad (6)$$

When ML/TL exceeds the upper limit of the condition, the minimum thickness of a plastic lens on the axis becomes too big to the whole length of the optical system. Accordingly, workability of glass lens is aggravated since the thickness of center portion of the glass lens cannot be sufficiently secured. On the other hand, when it is less the lower limit, productivity is aggravated since plastic resin cannot be entered smoothly into a formation die because the minimum thickness of a plastic lens on the axis is too small, and accordingly it causes generation of stress, double refraction and more time consuming for molding.

In the image forming optical system of the present invention, it is better to satisfy the following condition.

$$0.05 < ML/TL < 0.10 \quad (6')$$

Furthermore, the image forming optical system of the present invention it is more better to satisfy the following condition:

$$0.06 < ML/TL < 0.08 \quad (6'')$$

As to an electric device, it is desirable that it is equipped with the image forming optical system mentioned above.

Hereafter, embodiments of the present invention will be explained using drawings.

THE FIRST EMBODIMENT

Figure 1:
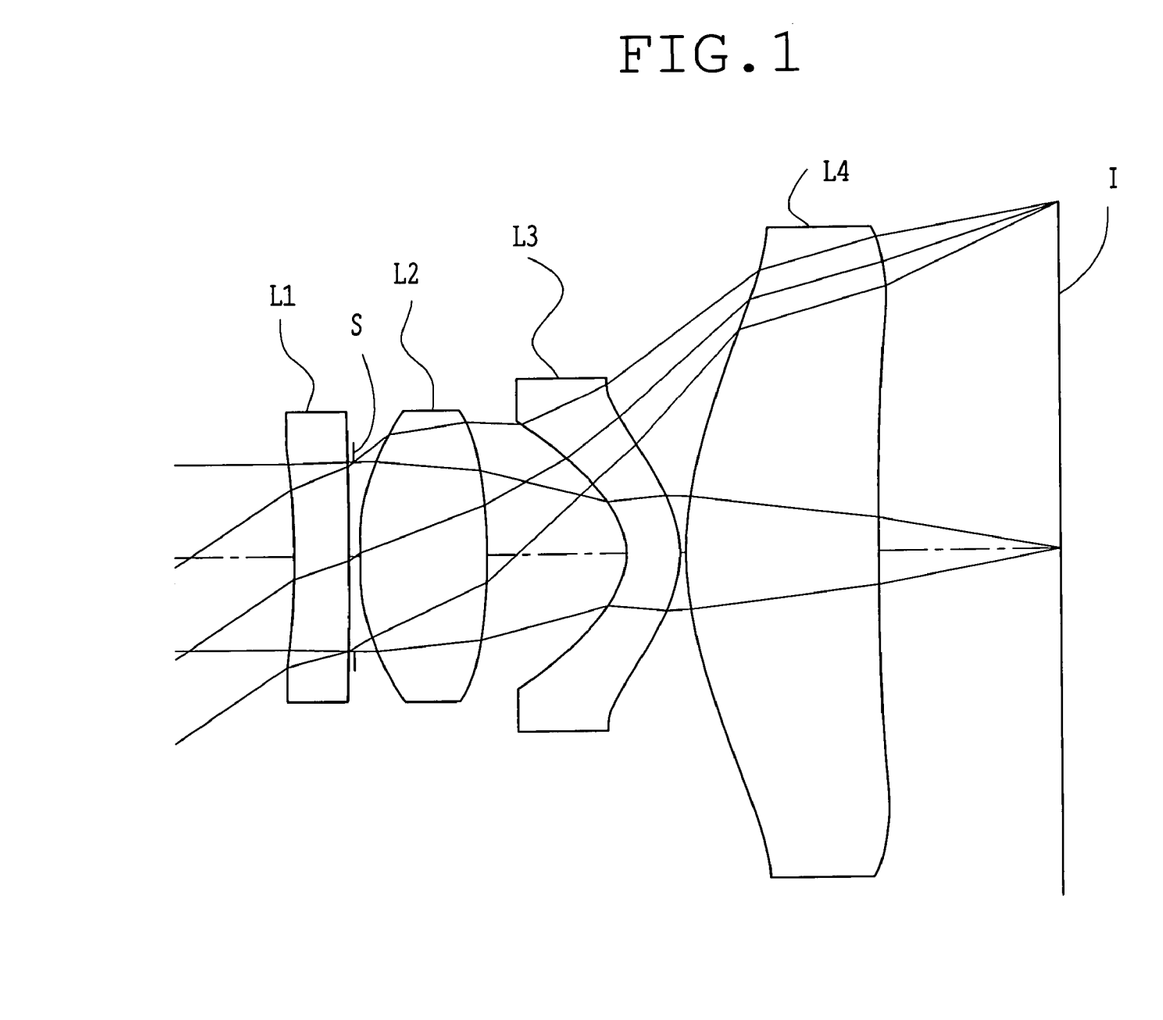
FIG. 1 is a sectional view showing an optical arrangement developed along the optical axis in the first embodiment of an image forming optical system according to the present invention.
Figure 2A:
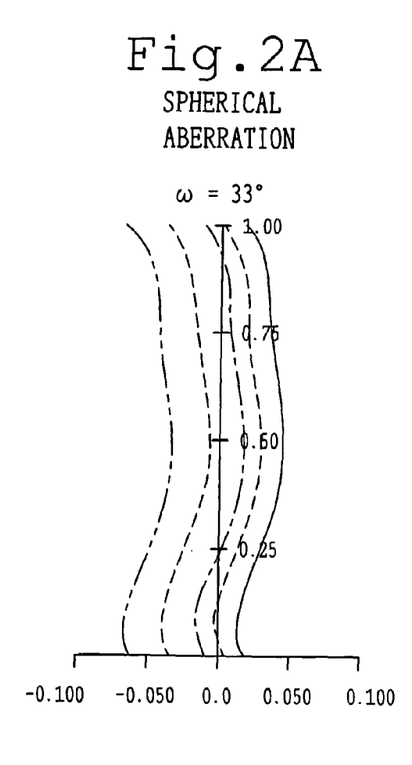
FIGS. 2A, 2B and 2C are diagrams showing spherical aberration, astigmatism and distortion in the first embodiment of an image forming optical system according to the present invention.
Figure 2B:
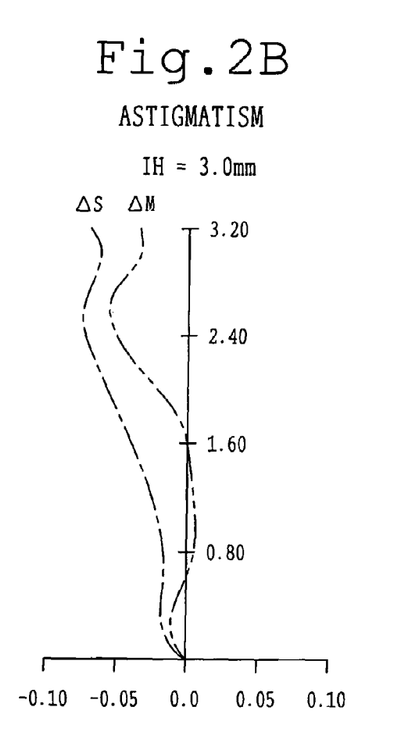
Figure 2C:
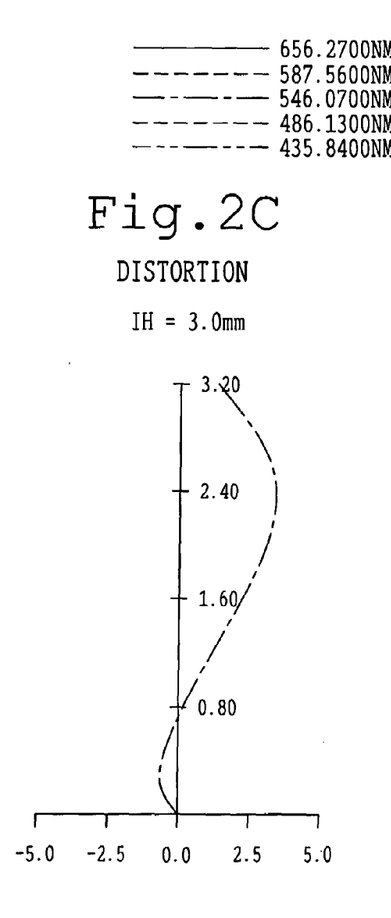

FIG. 1 is a sectional view showing an optical arrangement developed along the optical axis in the first embodiment of an image forming optical system according to the present invention. FIGS. 2A, 2B and 2C are diagrams showing spherical aberration, astigmatism and distortion of an image forming optical system in the first embodiment respectively.

In FIG. 1, the image forming optical system comprises, in order from an object side, a negative lens L1, an aperture stop S, a double convex lens L2, a negative meniscus lens L3, and a positive lens L4. In FIG. 1, the reference symbol I represents an image plane of an imaging element.

The negative lens L1 is the first lens, a concave surface of which is directed toward an object side. The double convex lens L2 is the second lens. The negative meniscus lens L3 is the third lens, a convex surface of which is directed toward an image side. The positive lens L4 is the fourth lens.

An aspherical surface is formed on both surfaces of the negative lens L1, both surfaces of the double convex lens L2, both surfaces of the negative meniscus lens L3 and both surfaces of the positive lens L4.

An aspherical surface at the object side of the positive lens L4 is formed so that its radius of curvature decreases from a center portion toward a circumferential portion and another surface at an image side of the lens L4 is formed so that its radius of curvature increases from a center portion toward a circumferential portion.

Lens data of optical members constituting the image forming optical system of the first embodiment are listed below.

In the first embodiment, all of lenses is made of plastic. As plastic materials used here, polycarbonate is used for the first lens and the third lens, and Zeonex which is polyolefin material is used for the second lens and the fourth lens.

On the image plane of the image forming optical system, an imaging element having 1,300,000 pixels (a pitch of picture element 3.6 μm) in ⅓ inches square is arranged.

Also, when z is taken as the coordinate in the direction of the optical axis, y is taken as the coordinate normal to the optical axis, K represents a conic constant, and a, b, c and d represent aspherical coefficients, the configuration of each of the aspherical surface is expressed by the following equation:

$$z = (y^2/r) / \left[1 + \{1 - (1+K)(y/r)^2\}^{1/2}\right] + ay^4 + by^6 + cy^8 + dy^{10}$$

These symbols hold for the numerical data of embodiments to be described later.

Numerical Data 1
the focal length is 4.50 mm,
Fno (fully opened F number) is 2.8,
the image height is 3.0 mm,
half field angle is 33°.

| Surface No. | Radius curvature | Surface distance (Air space) | Refraction Index | Abbe's No. |
|---|---|---|---|---|
| Object surface | ∞ | ∞ | | |
| 1 | aspherical [1] | 0.50 | 1.5839 | 30.2 |
| 2 | aspherical [2] | 0.05 | | |
| 3 | aperture stop | 0.05 | | |
| 4 | aspherical [3] | 1.17 | 1.5256 | 56.4 |
| 5 | aspherical [4] | 1.27 | | |
| 6 | aspherical [5] | 0.50 | 1.5839 | 30.2 |
| 7 | aspherical [6] | 0.05 | | |
| 8 | aspherical [7] | 1.77 | 1.5256 | 56.4 |
| 9 | aspherical [8] | 1.65 | | |
| Image plane | ∞ | | | | aspherical [1]
radius of curvature −8.51 k = 4.0292 × 10^{+0}
a = −9.2382 × 10^{−3}    b = 5.4040 × 10^{−3} aspherical [2]
radius of curvature −17.69 k = −1.4995 × 10^{+3}
a = −1.2681 × 10^{−2}    b = 2.0121 × 10^{−2}
c = −3.6133 × 10^{−3} aspherical [3]
radius of curvature 2.37 k = −4.2426 × 10^{−2}
a = 1.6427 × 10^{−2}    b = −5.8708 × 10^{−3} aspherical [4]
radius of curvature −6.34 k = 0
a = −1.7116 × 10^{−2}    b = −7.9778 × 10^{−3}
c = −2.4473 × 10^{−3} aspherical [5]
radius of curvature −0.62 k = −8.5133 × 10^{−1}
a = 1.9064 × 10^{−1}    b = −3.9020 × 10^{−4}
c = −1.5761 × 10^{−3} aspherical [6]
radius of curvature −1.06 k = −1.0134 × 10^{+0}
a = 4.6367 × 10^{−2}    b = 1.4527 × 10^{−2}
c = −4.7445 × 10^{−4} aspherical [7]
radius of curvature 2.58 k = −7.7917 × 10^{+0}
a = 4.3127 × 10^{−3}    b = −5.2307 × 10^{−4} aspherical [8]
radius of curvature 74.34 k = −1.8617 × 10^{+11}
a = 8.9152 × 10^{−3}    b = −1.1493 × 10^{−3}

THE SECOND EMBODIMENT

Figure 3:
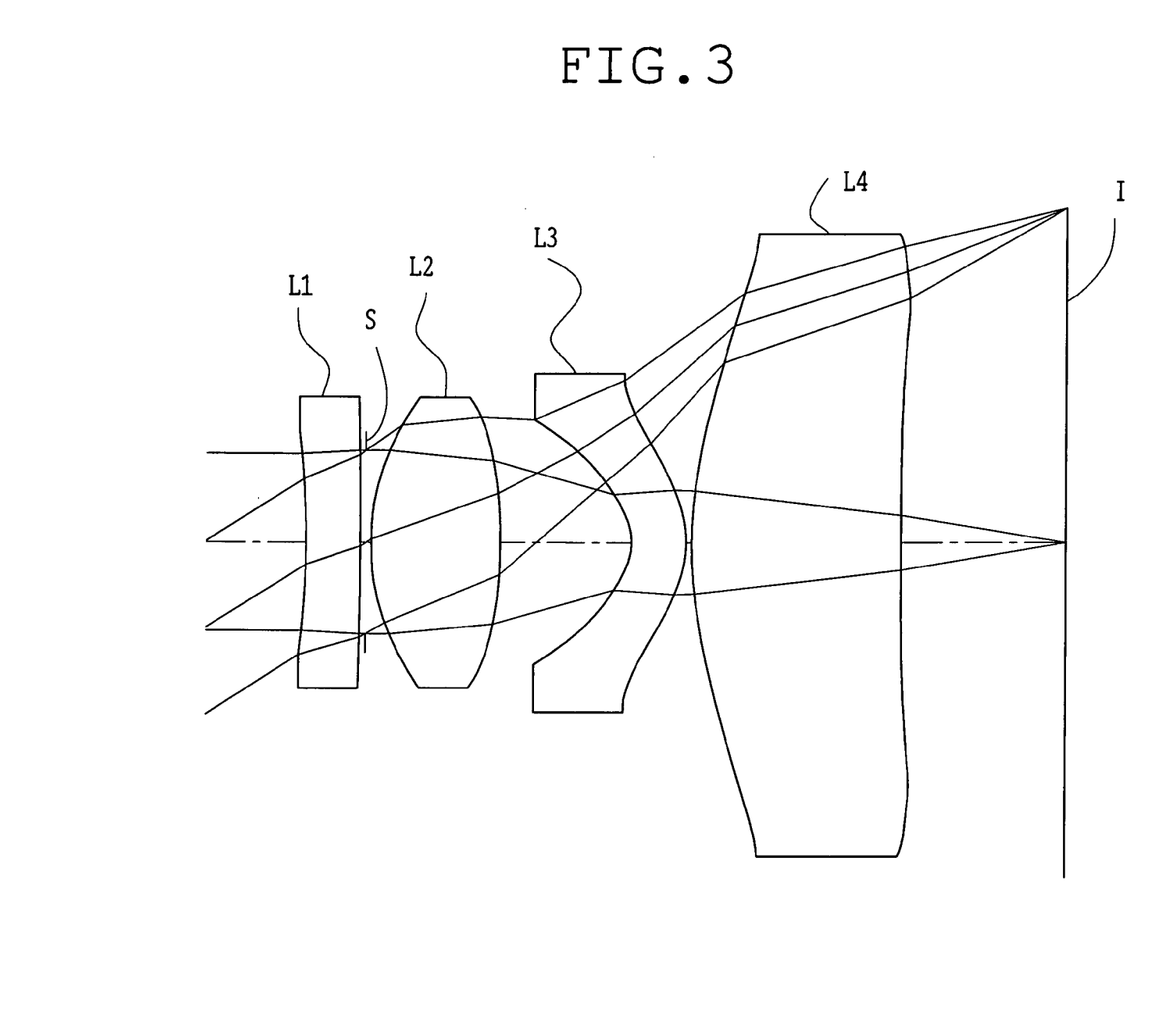
FIG. 3 is a sectional view showing an optical arrangement, developed along the optical axis in the second embodiment of an image forming optical system according to the present invention.
Figure 4A:
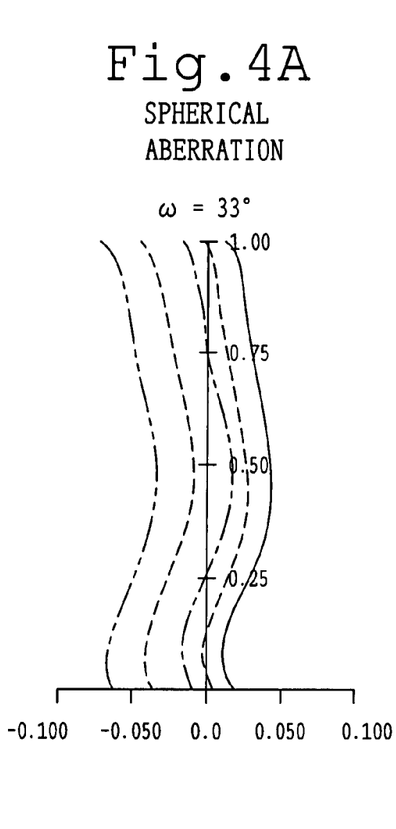
FIGS. 4A, 4B and 4C are diagrams showing spherical aberration, astigmatism and distortion in the second embodiment of an image forming optical system according to the present invention.
Figure 4B:
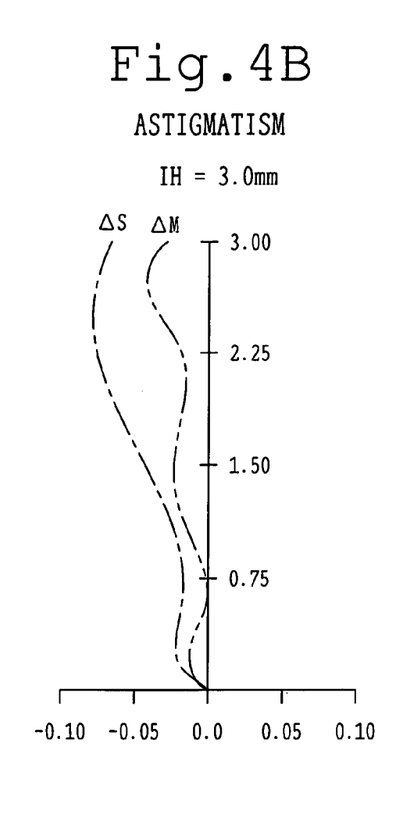
Figure 4C:
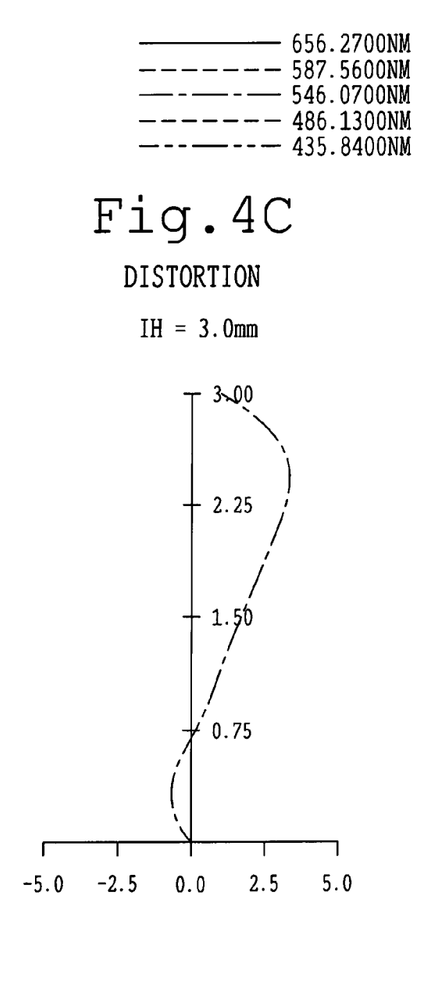

FIG. 3 is a sectional view showing an optical arrangement developed along the optical axis in the second embodiment of an image forming optical system according to the present invention. FIGS. 4A, 4B and 4C are diagrams showing spherical aberration, astigmatism and distortion of an image forming optical system in the second embodiment respectively.

The image forming optical system of the second embodiment comprises, in order from an object side, a negative lens L1, an aperture stop S, a double convex lens L2, a negative meniscus lens L3, and a positive lens L4. In FIG. 3, the reference symbol I represents an image plane of an imaging element.

The negative lens L1 is the first lens, a concave surface of which is directed toward an object side. The double convex lens L2 is the second lens. The negative meniscus lens L3 is the third lens, a convex surface of which is directed toward an image side. The positive lens L4 is the fourth lens.

An aspherical surface is formed on both surfaces of the negative lens L1, both surfaces of the double convex lens L2, both surfaces of the negative meniscus lens L3 and both surfaces of the positive lens L4.

An aspherical surface at the object side of the positive lens L4 is formed so that its radius of curvature decreases from a center portion toward a circumferential portion and another surface at an image side of the lens L4 is formed so that its radius of curvature increases from a center portion toward a circumferential portion.

Lens data of optical members constituting the image forming optical system of the second embodiment are listed below.

In the second embodiment, all of lenses is made of plastic. As plastic materials used here, polycarbonate is used for the first lens and the third lens, and Zeonex (registered trademark) which is polyolefin material is used for the second lens and the fourth lens.

On the image plane of the image forming optical system, an imaging element having 2,000,000 pixels (a pitch of picture element 3.0 μm) in ⅓ inches square is arranged.

Numerical Data 2
the focal length is 4.78 mm,
Fno (fully opened F number) is 3.0,
the image height is 3.0 mm,
half field angle is 32°.

| Surface No. | Radius curvature | Surface distance (Air space) | Refraction Index | Abbe's No. |
| --- | --- | --- | --- | --- |
| Object surface | ∞ | ∞ | | |
| 1 | aspherical [1] | 0.50 | 1.5839 | 30.2 |
| 2 | aspherical [2] | 0.05 | | |
| 3 | aperture stop | 0.05 | | |
| 4 | aspherical [3] | 1.20 | 1.5256 | 56.4 |
| 5 | aspherical [4] | 1.21 | | |
| 6 | aspherical [5] | 0.50 | 1.5839 | 30.2 |
| 7 | aspherical [6] | 0.05 | | |
| 8 | aspherical [7] | 1.95 | 1.5256 | 56.4 |
| 9 | aspherical [8] | 1.51 | | |
| Image plane | ∞ | | | | aspherical [1]
radius of curvature −7.73

$k = 4.0464 \times 10^{+0}$
$a = -9.6372 \times 10^{-3}$    $b = 7.2983 \times 10^{-3}$ aspherical [2]
radius of curvature −18.73

$k = -1.6537 \times 10^{+3}$
$a = -5.5816 \times 10^{-3}$    $b = 1.8873 \times 10^{-2}$ aspherical [3]
radius of curvature 2.27

$k = 4.2301 \times 10^{-3}$
$a = 1.7901 \times 10^{-2}$    $b = -7.1867 \times 10^{-3}$ aspherical [4]
radius of curvature −4.91

$k = 0$
$a = -2.1804 \times 10^{-2}$    $b = -1.0665 \times 10^{-2}$ aspherical [5]
radius of curvature −0.63

$k = -8.2163 \times 10^{-1}$
$a = 1.8614 \times 10^{-1}$    $b = 7.3802 \times 10^{-3}$ aspherical [6]
radius of curvature −1.09

$k = -1.1681 \times 10^{+0}$
$a = 5.4980 \times 10^{-2}$    $b = 1.0262 \times 10^{-2}$ aspherical [7]
radius of curvature 3.27

$k = -7.5428 \times 10^{+0}$
$a = -8.9832 \times 10^{-5}$    $b = -1.3689 \times 10^{-4}$ aspherical [8]
radius of curvature 59.09

$k = -1.8617 \times 10^{+11}$
$a = 9.4142 \times 10^{-3}$    $b = -1.2653 \times 10^{-3}$

THE THIRD EMBODIMENT

Figure 5:
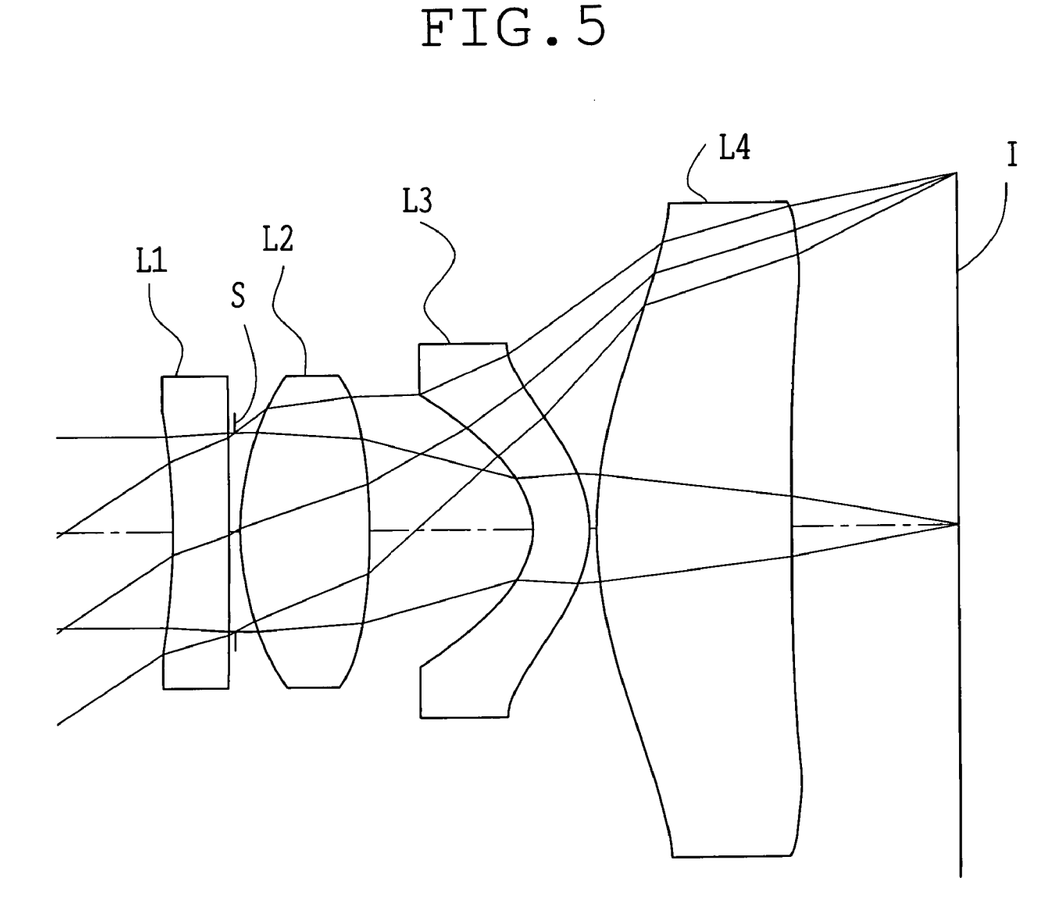
FIG. 5 is a sectional view showing an optical arrangement, developed along the optical axis in the third embodiment of an image forming optical system according to the present invention.
Figure 6A:
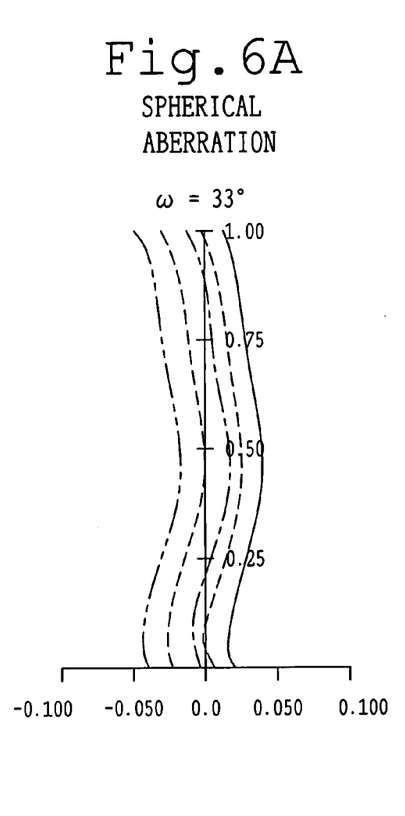
FIGS. 6A, 6B and 6C are diagrams showing spherical aberration, astigmatism and distortion in the third embodiment of an image forming optical system according to the present invention.
Figure 6B:
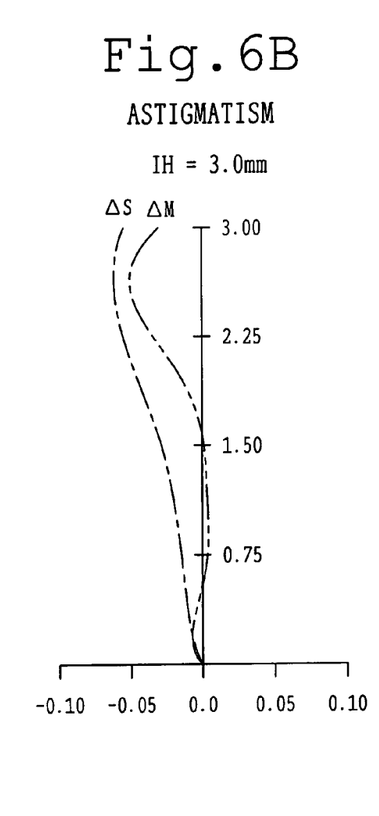
Figure 6C:
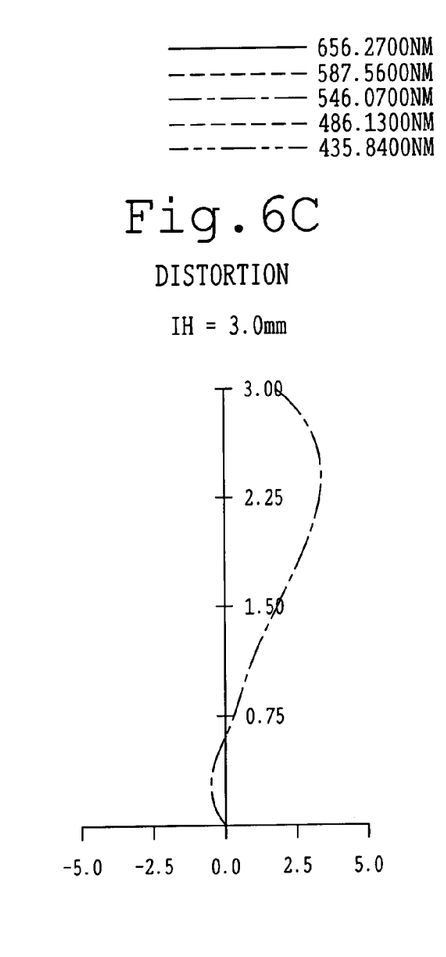

FIG. 5 is a sectional view showing an optical arrangement developed along the optical axis in the third embodiment of an image forming optical system according to the present invention. FIGS. 6A, 6B and 6C are diagrams showing spherical aberration, astigmatism and distortion of an image forming optical system in the third embodiment respectively.

The image forming optical system of the third embodiment comprises in order from an object side, a negative lens L1, an aperture stop S, a double convex lens L2, a negative meniscus lens L3, and a positive lens L4. In FIG. 5, the reference symbol I represents an image plane of an imaging element.

The negative lens L1 is the first lens, a concave surface of which is directed toward an object side. The double convex lens L2 is the second lens. The negative meniscus lens L3 is the third lens, a convex surface of which is directed toward an image side. The positive lens L4 is the fourth lens.

An aspherical surface is formed on both surfaces of the negative lens L1, both surfaces of the double convex lens L2, both surfaces of the negative meniscus lens L3 and both surfaces of the positive lens L4.

An aspherical surface at the object side of the positive lens L4 is formed so that its radius of curvature decreases from a center portion toward a circumferential portion and another surface at an image side is formed so that its radius of curvature increases from a center portion toward a circumferential portion Lens data of optical members constituting the image forming optical system of the third embodiment are listed below.

In the third embodiment, the first lens L1, the third lens L3 and the fourth lens L4 are made of plastic. The second lens L2 is made of glass. As plastic materials used here, polycarbonate is used for the first lens L1 and the third lens L3, and Zeonex which is polyolefin material is used for the fourth lens L4.

On the image plane of the image forming optical system, an imaging element having 3,000,000 pixels (a pitch of picture element 2.4 μm) in ⅓ inches square is arranged.

Numerical Data 3
the focal length is 4.69 mm,
Fno (fully opened F number) is 2.08,
the image height is 3.0 mm,
half field angle is 33°.

| Surface No. | Radius curvature | Surface distance (Air space) | Refraction Index | Abbe's No. |
| --- | --- | --- | --- | --- |
| Object surface | ∞ | ∞ | | |
| 1 | aspherical [1] | 0.50 | 1.5839 | 30.2 |
| 2 | aspherical [2] | 0.05 | | |
| 3 | aperture stop | 0.05 | | |
| 4 | aspherical [3] | 1.15 | 1.5891 | 61.2 |
| 5 | aspherical [4] | 1.47 | | |
| 6 | aspherical [5] | 0.50 | 1.5839 | 30.2 |
| 7 | aspherical [6] | 0.05 | | |
| 8 | aspherical [7] | 1.73 | 1.5256 | 56.4 |
| 9 | aspherical [8] | 1.51 | | |
| Image plane | ∞ | | | |

-continued aspherical [1]
radius of curvature −7.16

$k = 4.4604 \times 10^{+0}$
$a = -1.0893 \times 10^{-2}$      $b = 7.9089 \times 10^{-3}$ aspherical [2]
radius of curvature −18.96

$k = -1.4350 \times 10^{+3}$
$a = -2.9077 \times 10^{-3}$      $b = 1.7700 \times 10^{-2}$ aspherical [3]
radius of curvature 2.69

$k = 6.3974 \times 10^{-2}$
$a = 1.8395 \times 10^{-2}$      $b = -5.6187 \times 10^{-3}$ aspherical [4]
radius of curvature −5.73

$k = 0$
$a = -1.3960 \times 10^{-2}$      $b = -7.9821 \times 10^{-3}$ aspherical [5]
radius of curvature −0.64

$k = -8.3668 \times 10^{-1}$
$a = 1.6135 \times 10^{-1}$      $b = 7.2167 \times 10^{-4}$ aspherical [6]
radius of curvature −1.09

$k = -9.8826 \times 10^{-1}$
$a = 4.4331 \times 10^{-2}$      $b = 9.9636 \times 10^{-3}$ aspherical [7]
radius of curvature 2.85

$k = -8.4882 \times 10^{+0}$
$a = 3.8781 \times 10^{-3}$      $b = -5.5494 \times 10^{-4}$ aspherical [8]
radius of curvature 96.57

$k = -1.8617 \times 10^{+11}$
$a = 9.7735 \times 10^{-3}$      $b = -1.2384 \times 10^{-3}$

THE FOURTH EMBODIMENT

Figure 7:
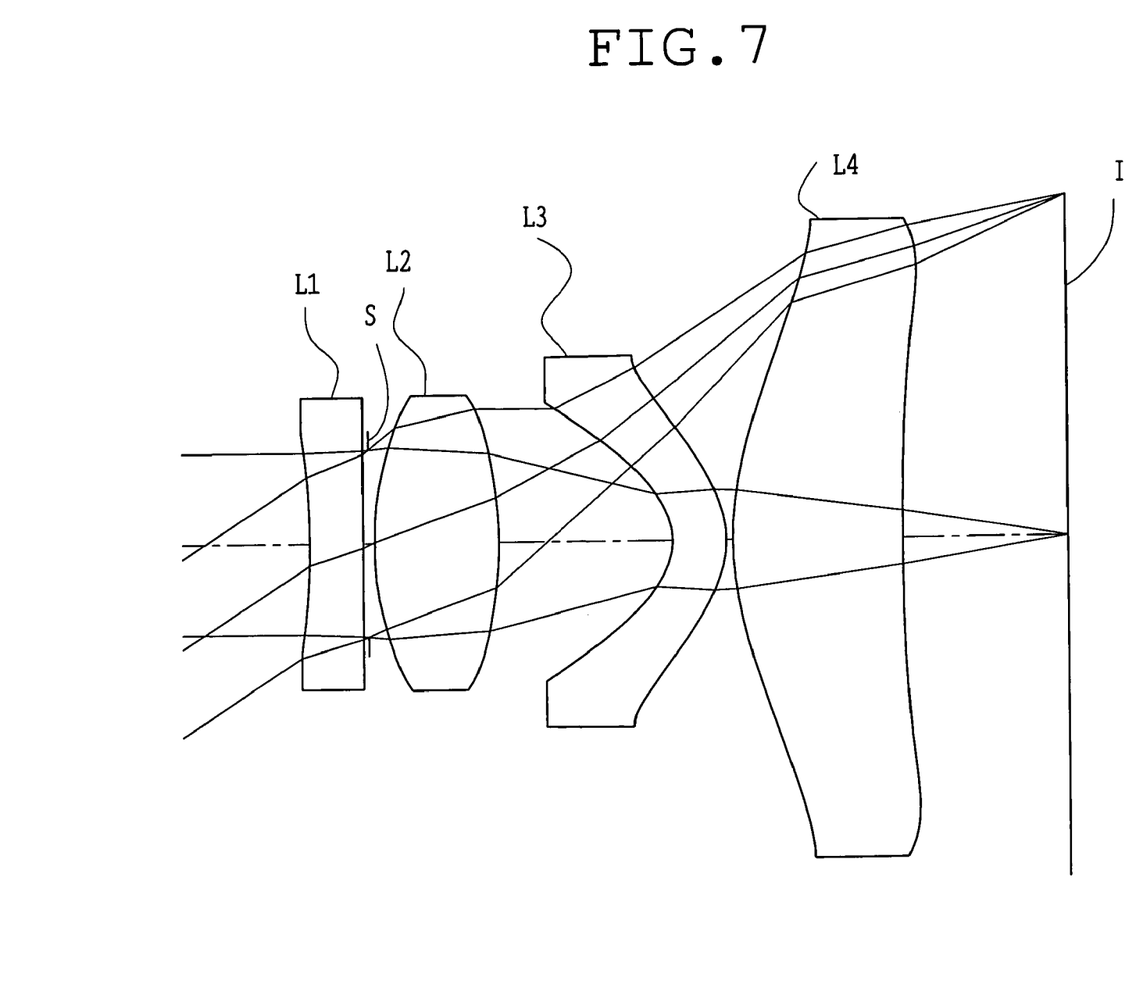
FIG. 7 is a sectional view showing an optical arrangement, developed along the optical axis in the fourth embodiment of an image forming optical system according to the present invention.
Figure 8A:
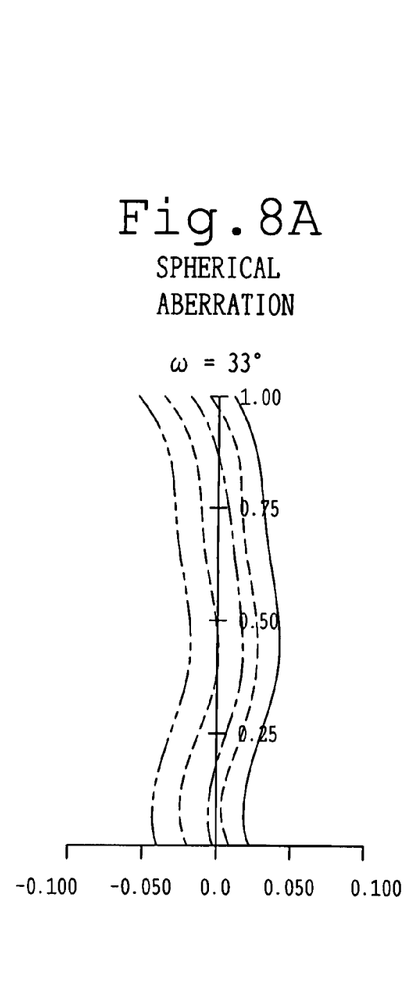
FIGS. 8A, 8B and 8C are diagrams showing a spherical aberration, an astigmatism and a distortion in the fourth embodiment of an image forming optical system according to the present invention.
Figure 8B:
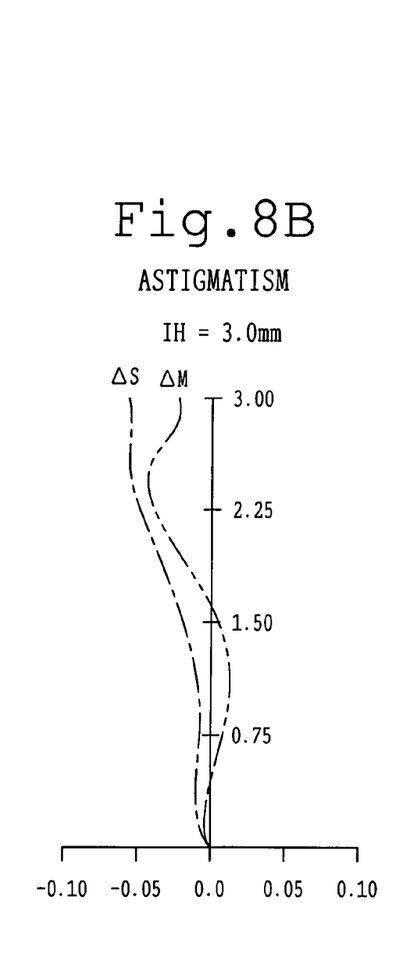
Figure 8C:
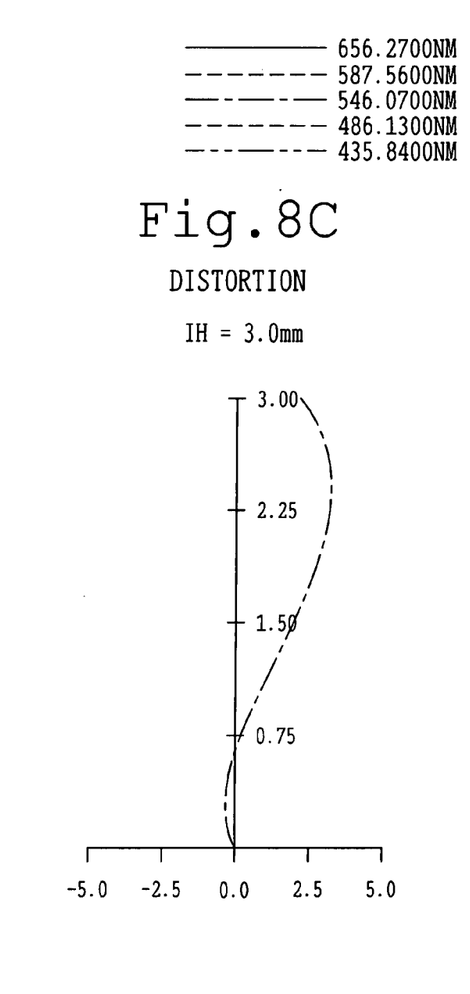

FIG. 7 is a sectional view showing an optical arrangement developed along the optical axis in the fourth embodiment of an image forming optical system according to the present invention. FIGS. 8A, 8B and 8C are diagrams showing spherical aberration, astigmatism and distortion of an image forming optical system in the fourth embodiment respectively.

The image forming optical system in the fourth embodiment comprises in order from an object side, a negative lens L1, an aperture stop S, a double convex lens L2, a negative meniscus lens L3 and a positive lens L4. In FIG. 7, the reference symbol I represents an image plane of an imaging element.

The negative lens L1 is the first lens, a concave surface of which is directed toward an object side. The double convex lens L2 is the second lens. The negative meniscus lens L3 is the third lens, a convex surface of which is directed toward an image side. The positive lens L4 is the fourth lens.

An aspherical surface is formed on both surfaces of the negative lens L1, both surfaces of the double convex lens L2, both surfaces of the negative meniscus lens L3 and both surfaces of the positive lens L4.

An aspherical surface at the object side of the positive lens L4 is formed so that its radius of curvature decreases from a center portion toward a circumferential portion and another surface at an image side is formed so that its radius of curvature increases from a center portion toward a circumferential portion Lens data of optical members constituting the image forming optical system of the fourth third embodiment are listed below.

In the fourth embodiment, the first lens L1 and the second lens L2 are made of glass. The third lens L3 and the fourth lens L4 are made of plastic. As plastic materials used here, polycarbonate is used for the third lens, and Zeonex which is polyolefin material is used for the fourth lens.

On the image plane of the image forming optical system, an imaging element having 2,000,000 pixels (a pitch of picture element 3.0 μm ) in ⅓ inches square is arranged.

Numerical Data 4 the focal length is 4.65 mm,

Fno (fully opened F number) is 2.8, the image height is 3.0 mm, half field angle is 33°.

| Surface No. | Radius curvature | Surface distance (Air space) | Refraction Index | Abbe's No. |
|---|---|---|---|---|
| Object Surface | ∞ | ∞ | | |
| 1 | aspherical [1] | 0.50 | 1.6889 | 31.1 |
| 2 | aspherical [2] | 0.05 | | |
| 3 | aperture stop | 0.05 | | |
| 4 | aspherical [3] | 1.15 | 1.5891 | 61.2 |
| 5 | aspherical [4] | 1.62 | | |
| 6 | aspherical [5] | 0.50 | 1.5839 | 30.2 |
| 7 | aspherical [6] | 0.05 | | |
| 8 | aspherical [7] | 1.58 | 1.5256 | 56.4 |
| 9 | aspherical [8] | 1.51 | | |
| Image plane | ∞ | | | | aspherical [1]
radius of curvature −8.61

$k = 1.1103 \times 10^{+1}$
$a = -1.4213 \times 10^{-2}$      $b = 8.6552 \times 10^{-3}$ aspherical [2]
radius of curvature −27.14

$k = -3.3974 \times 10^{+3}$
$a = -8.9603 \times 10^{-4}$      $b = 1.6841 \times 10^{-2}$ aspherical [3]
radius of curvature 3.02

$k = 1.0519 \times 10^{-1}$
$a = 2.2570 \times 10^{-2}$      $b = -7.7753 \times 10^{-3}$ aspherical [4]
radius of curvature −4.49

$k = 0$
$a = -1.3744 \times 10^{-2}$      $b = -8.1406 \times 10^{-3}$ aspherical [5]
radius of curvature −0.60

$k = -8.8511 \times 10^{-1}$
$a = 1.5727 \times 10^{-1}$      $b = -1.8466 \times 10^{-2}$
$c = 6.2187 \times 10^{-3}$ aspherical [6]
radius of curvature −1.05

$k = -9.1798 \times 10^{-1}$
$a = 3.3812 \times 10^{-2}$      $b = 1.2347 \times 10^{-2}$
$c = 1.8772 \times 10^{-4}$ aspherical [7]
radius of curvature 2.52

$k = -9.0831 \times 10^{+0}$
$a = 6.1655 \times 10^{-3}$      $b = -7.3921 \times 10^{-4}$ -continued aspherical [8]
radius of curvature 134.80

$k = -1.8617 \times 10^{+11}$
$a = 1.1536 \times 10^{-2}$   $b = -1.3339 \times 10^{-3}$ In the embodiments of the present invention, at least one of lenses is made of plastic. However, such lens can be constituted with glass instead of plastic. For example, if the lenses are constituted with glass having refractive index higher than those used in the embodiments, an optical system with higher performance can be achieved. If special low dispersion glass is used, it is effective for the correction of chromatic aberration. Moreover, when a lens is constituted with plastic, degradation of performance owing to environmental change can be mitigated by using low moisture-absorption material.

In each embodiment mentioned above, a flare cut stop may be used instead of an aperture stop in order to cut an unnecessary light of ghost, flare and the like. This flare cut aperture may be arranged in any place which is in front of the first lens, between the first lens and the aperture stop, between the aperture stop and the second lens, between the second lens and the third lens, or between the third lens and the image plane.

In order to get function of the flare cut stop, it is possible to use a method in which a flare light is cut by a frame, or another method in which a flare light is cut by arranging another member. Also, it is possible to constitute a flare cut stop by printing, painting and gluing a seal and the like, directly to the image forming optical system. As to the shape of the stop, any type of shape formed by such as a circle, an ellipse, a rectangle, a polygon and a scope surrounded by a function curve can be also used.

By arranging a flare stop, it is possible to cut not only detrimental luminous flux but also luminous flux of the coma flare and the like at a circumferential portion on the picture plane.

Moreover, when a coating for preventing of reflection is made to each lens, a ghost and flare can be reduced. If a multiple coating is made, the ghost and the flare can be efficiently reduced. Furthermore, infrared cut coating can be also made to a surface of a lens and a cover glass and the like.

In each embodiment mentioned above, focusing can be carried out for adjusting the focus. As focusing methods, it is possible to use any of method such as a method where the whole lenses or a part of lenses is moved outward for focusing, or a method where the whole lenses or the other type method where a part of lenses is moved inward for focusing.

In each embodiment mentioned above, decrease of the brightness around circumferential portion of a picture image plane can be reduced by shifting a micro lens of CCD. For example, the design of the micro lens of CCD may be changed according to the incidence angle of the light at each image height. Correction of decreased quantity of the brightness around circumferential portion of a picture image plane can be carried out by image processing.

Although illustration has not been shown, the optical system of the present invention is suitable for optical equipment such as a camera and a surveillance camera in which film or CCD is used as recording member. Therefore, an optical device equipped with the optical system mentioned above is also included in the present invention.

The numerical values calculated by the conditions of each embodiment 1 to 4 mentioned above are shown in the following table 1.

TABLE 1

| example | the first example | the second example | the third example | the fourth example |
|---|---|---|---|---|
| φm/φp | 0.37 | 0.38 | 0.34 | 0.28 |
| r1f/f | −1.89 | −1.62 | −1.53 | −1.85 |
| r12/r2f | 0.84 | 0.72 | 0.79 | 0.80 |
| EXP/f | 1.62 | 1.33 | 1.51 | 1.67 |
| Fno/P | 0.078 | 1.00 | 1.17 | 0.93 |
| ML/TL | 0.07 | 0.07 | 0.07 | 0.07 |

Figure 9A:
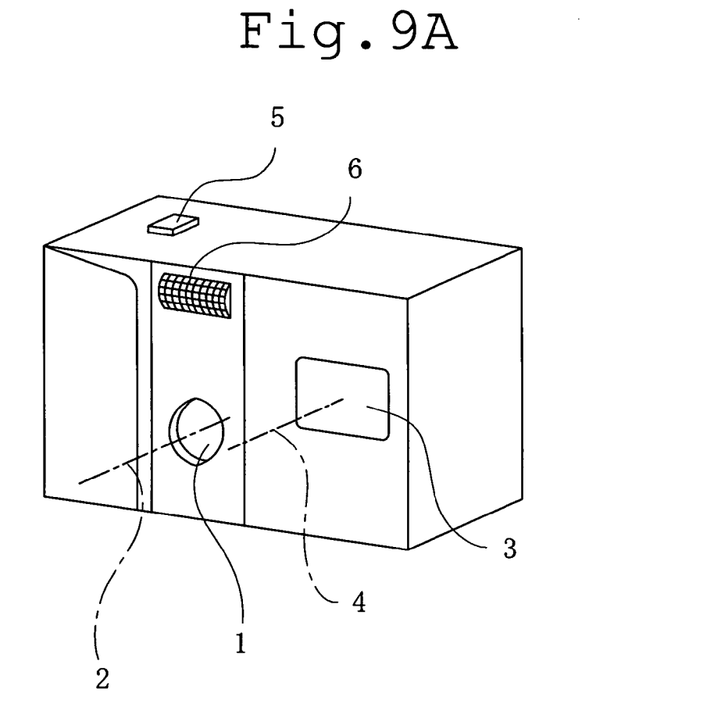
FIG. 9A is a front perspective view showing an outlined construction of a digital camera using an image forming optical system according to the present invention.
Figure 9B:
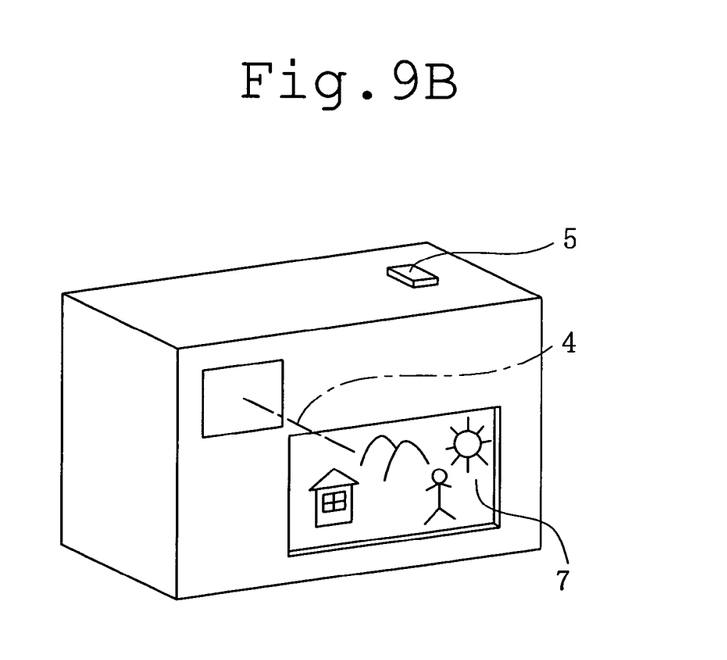
FIG. 9B is a rear perspective view showing an outlined construction of a digital camera using an image forming optical system according to the present invention.

FIGS. 9A and 9B are a front perspective view and a rear perspective view showing an external appearance of a digital camera in which an image forming optical system according to the present invention is used in a photographing optical system. In FIG. 9, reference numeral 1 represents a photographing optical system having photographing optical path 2, reference numeral 3 is finder optical system with an optical path 4 for finder, reference numeral 5 is a shutter button, reference numeral 6 is a flush lump and reference numeral 7 is a monitor with liquid crystal display. When pressing the shutter button 5 arranged on the camera, in responding such action, photographing is carried out via the photographing optical system 1.

Figure 10A:
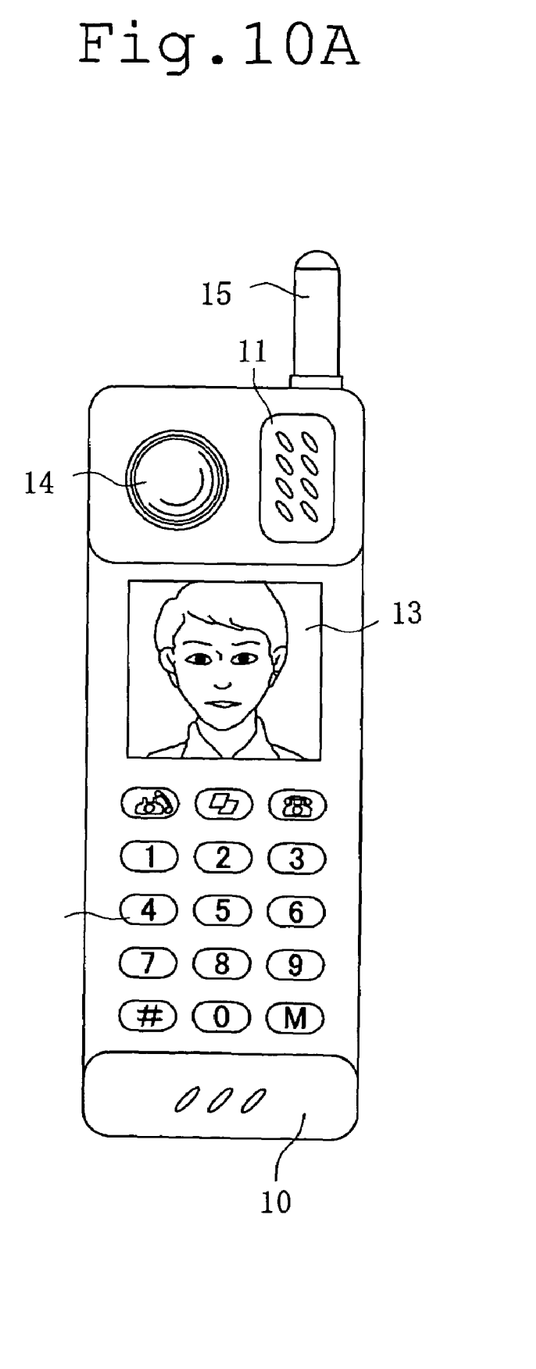
FIGS. 10A and 10B are a front perspective view and a side perspective view showing an outlined construction of a cellular phone using an image forming optical system according to the present invention.
Figure 10B:
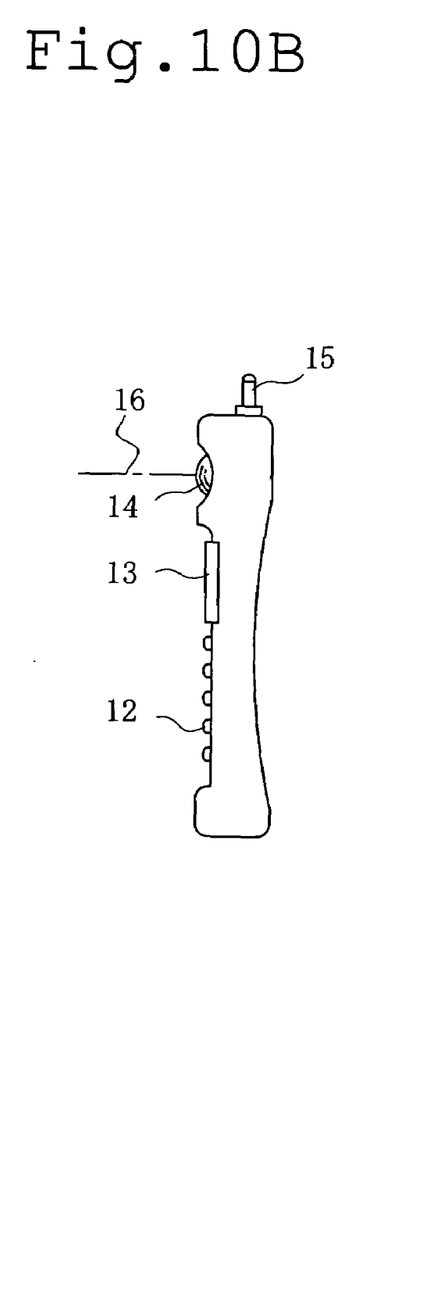

FIGS. 10A and 10B are a front view and a side view showing an example of a cellular phone in which an image forming optical system according to the present invention is used in a photographing optical system. In FIG. 10, reference numeral 10 represents a microphone portion, reference numeral 11 is a speaker portion, 12 is an input dial, 13 is a monitor, 14 is a photographing optical system and 15 is an antenna by which transmission and reception of electric waves for communication is performed. The microphone portion 10 inputs an operator's voice as information, and the speaker portion 11 outputs a communication partner's voice. The input dial 12 is used for an operator inputting information, and the monitor 13 displays information, such as photographed image of the operator as well as a telephone call partner, and a telephone number. The photographing optical system 14 has the image forming optical system of the present invention arranged on the photographing optical path 16, and the imaging element which receives an image light, which are arranged in the cellular phone. An IR cut filter is arranged in front of an imaging element, and a cover glass for protecting this optical system at the top of the photographing optical system 14 is arranged. The object image received with the imaging element is inputted into the processing means (not illustrated) which is built in the cellular phone, and is displayed as an electronic picture on the monitor 13 and/or another monitor at a communication partner's side. When transmitting a picture image to a communication partner, an information of the object image received by the imaging element is converted into a signal which can be transmitted, by the signal-processing function included in the processing means mentioned above.

What is claimed is:
1. An image forming optical system comprising: in order from an object side,
a first lens which is a negative lens having a concave surface directed toward an object side, an aperture stop, a second lens which is a double convex lens,
a third lens which is a negative meniscus lens having a convex surface directed toward an image side, and
a fourth lens which is a positive lens,
wherein a surface at an object side of the fourth lens is an aspherical surface, a radius of curvature of which decreases from a center portion toward a circumferential portion and a surface at an image side of the fourth lens is an aspherical surface, a radius of curvature of which increases from a center portion toward a circumferential portion, and the following condition is satisfied:

$$0.05 < \phi m/\phi p < 0.80$$

where $\phi m$ represents the power of the fourth lens at the position of the maximum light height and $\phi p$ represents the power of the fourth lens at the position of the praxis.

2. An image forming optical system comprising: in order from an object side,
a first lens which is a negative lens having a concave surface directed toward an object side, an aperture stop,
a second lens which is a double convex lens,
a third lens which is a negative meniscus lens having a convex surface directed toward an image side, and
a fourth lens which is a positive lens,
wherein the image forming optical system satisfies the following condition $$-10.0 < r1f/f < -1.0$$

where r1f represents the radius of curvature of the first lens at the object side and f is the focal length of the image forming optical system as a whole system.

3. An image forming optical system comprising: in order from an object side,
a first lens which is a negative lens having a concave surface directed toward an object side, an aperture stop,
a second lens which is a double convex lens,
a third lens which is a negative meniscus lens having a convex surface directed toward an image side, and
a fourth lens which is a positive lens,
wherein the image forming optical system satisfies the following condition $$0.55(1/\mu m) < Fno/P(\mu m) < 2.10(1/\mu m)$$

where Fno represents the F number fully opened in the image forming optical system and P represents the pixel pitch of an imaging element.

4. An image forming optical system comprising: in order from an object side,
a first lens which is a negative lens having a concave surface directed toward an object side, an aperture stop,
a second lens which is a double convex lens,
a third lens which is a negative meniscus lens having a convex surface directed toward an image side, and
a fourth lens which is a positive lens,
wherein the image forming optical system satisfies the following condition $$0.03 < ML/TL < 0.15$$

where TL represents the whole length of the image forming optical system and ML represents the minimum thickness on the axis of a plastic lens constituting the image forming optical system.

5. An image forming optical system comprising: in order from an object side,
a first lens which is a negative lens having a concave surface directed toward an object side, an aperture stop,
a second lens which is a double convex lens,
a third lens which is a negative meniscus lens having a convex surface directed toward an image side, and
a fourth lens which is a positive lens,
wherein the image forming optical system satisfies the following condition $$0.03 < f12/f < 2.0$$

where f12 represents the composite focal length of the first lens and the second lens, and f represents the whole focal length of the image forming optical system.

6. An image forming optical system according to claim 1, comprising: in order from an object side,
a first lens which is a negative lens having a concave surface directed toward an object side, an aperture stop,
a second lens which is a double convex lens,
a third lens which is a negative meniscus lens having a convex surface directed toward an image side, and
a fourth lens which is a positive lens,
wherein the image forming optical system satisfies the following condition $$0.5 < EXP/f < 2.5$$

where EXP represents the distance of the exit pupil from an image plane and f is the whole focal length of the image forming optical system.

* * * * *

UNITED STATES PATENT AND TRADEMARK OFFICE
CERTIFICATE OF CORRECTION

| | | |
|---|---|---|
| PATENT NO. | : 7,095,570 B2 | Page 1 of 1 |
| APPLICATION NO. | : 10/842650 | |
| DATED | : August 22, 2006 | |
| INVENTOR(S) | : Takahiro Amanai | |

It is certified that error appears in the above-identified patent and that said Letters Patent is hereby corrected as shown below:

In Column 16, line 31, please replace "An image forming optical system according to claim 1 comprising" with --An image forming optical system comprising--.

Signed and Sealed this

Twenty-seventh Day of November, 2007

JON W. DUDAS
*Director of the United States Patent and Trademark Office*